United States Patent
Zhang et al.

(10) Patent No.: US 10,957,065 B2
(45) Date of Patent: Mar. 23, 2021

(54) METHOD AND DEVICE FOR DETERMINING POSITION OF VIRTUAL OBJECT IN VIRTUAL SPACE

(71) Applicant: SHENZHEN DLODLO TECHNOLOGIES CO., LTD., Guangdong (CN)

(72) Inventors: Dawei Zhang, Shenzhen (CN); Shoulun Long, Shenzhen (CN); Gang Li, Shenzhen (CN); Fengxue Zhang, Shenzhen (CN); Xu Xiong, Shenzhen (CN)

(73) Assignee: SHENZHEN DLODLO TECHNOLOGIES CO., LTD., Guangdong (CN)

( * ) Notice: Subject to any disclaimer, the term of this patent is extended or adjusted under 35 U.S.C. 154(b) by 98 days.

(21) Appl. No.: 15/764,836

(22) PCT Filed: Mar. 16, 2016

(86) PCT No.: PCT/CN2016/076541
§ 371 (c)(1),
(2) Date: Mar. 29, 2018

(87) PCT Pub. No.: WO2017/054420
PCT Pub. Date: Apr. 6, 2017

(65) Prior Publication Data
US 2018/0211405 A1    Jul. 26, 2018

(30) Foreign Application Priority Data
Sep. 30, 2015  (CN) .......................... 201510638981.7

(51) Int. Cl.
*G06K 9/00*     (2006.01)
*G06T 7/70*     (2017.01)
(Continued)

(52) U.S. Cl.
CPC .................. *G06T 7/70* (2017.01); *G06F 3/01* (2013.01); *G06F 3/011* (2013.01); *G06F 3/017* (2013.01); *G06T 19/20* (2013.01)

(58) Field of Classification Search
CPC . G06F 3/01; G06F 3/017; G06F 3/011; G06T 19/20; G06T 7/70
See application file for complete search history.

(56) References Cited

U.S. PATENT DOCUMENTS 7,609,253 B2 * 10/2009  Trent, Jr. ............ G06F 3/03547
                                                    345/173
7,663,649 B2    2/2010  Takemoto et al.
(Continued)

FOREIGN PATENT DOCUMENTS

CN    102156859 A    8/2011
CN    102200881 A    9/2011
(Continued)

OTHER PUBLICATIONS

Extended European Search Report regarding International Application No. PCT/CN2016/076541 dated Jul. 19, 2018.
(Continued)

*Primary Examiner* — Amara Abdi
(74) *Attorney, Agent, or Firm* — Harness, Dickey & Pierce, P.L.C.

(57) ABSTRACT

Disclosed are a method and a device for determining the position of a virtual object in a virtual space. The method comprises: detecting whether a predetermined triggering condition is met; when the predetermined triggering condition is met, acquiring at least three sampling points by sampling a movement trajectory of a peripheral device in a reality space; when the movement trajectory forms a loop, determining a reality space plane on which the sampling points exist; converting the reality space plane into a target plane in the virtual space according to a preset transforma-
(Continued)

---

| | |
|---|---|
| Detecting whether a predetermined triggering condition for determining the position of a virtual object in a virtual space according to a movement trajectory of a peripheral device is met | 101 |
| Acquiring at least three sampling points by sampling the movement trajectory of the peripheral device in a reality space | 102 |
| Determining a reality space plane on which the sampling points exist when the movement trajectory forms a loop | 103 |
| Converting the reality space plane into a target plane in the virtual space according to a preset transformation relation | 104 |
| Determining the position of the virtual object in the virtual space by setting a designated side of the virtual object on the target plane | 105 | tion relation; and determining the position of a virtual object in the virtual space by setting a designated side of the virtual object on the target plane. By the method and the device according to the present invention, the position of a virtual object in a virtual space may be determined according to the position of a reality object in a reality space, thereby determining the position of the virtual object in the virtual space.

4 Claims, 1 Drawing Sheet

(51) Int. Cl.
*G06F 3/01* (2006.01)
*G06T 19/20* (2011.01)

(56) References Cited

U.S. PATENT DOCUMENTS

| 8,502,903 | B2 | 8/2013 | Kashitani |
| 9,483,119 | B2 | 11/2016 | Jiang |
| 2004/0021664 | A1* | 2/2004 | Takemoto ............ G06T 19/006 345/419 |
| 2005/0285879 | A1* | 12/2005 | Suzuki ................. G06T 19/006 345/633 |
| 2011/0019056 | A1 | 1/2011 | Hirsch et al. |
| 2013/0194173 | A1 | 8/2013 | Zhu et al. |
| 2014/0100813 | A1 | 4/2014 | Showering |
| 2015/0193982 | A1 | 7/2015 | Mihelich et al. |
| 2015/0309575 | A1 | 10/2015 | Jiang |

FOREIGN PATENT DOCUMENTS

| CN | 102722249 A | 10/2012 | |
| CN | 102961871 A | 3/2013 | |
| CN | 103246345 A | 8/2013 | |
| CN | 103744518 A | 4/2014 | |
| CN | 103995584 A | 8/2014 | |
| CN | 105224084 A | 1/2016 | |
| EP | 1255242 A1 | 11/2002 | |
| JP | 2004062758 A | 2/2004 | |
| JP | 2005157611 A | 6/2005 | |
| JP | 2006048147 A | 2/2006 | |
| JP | 2013003961 | * 1/2013 | ............ G06F 3/033 |
| JP | 2013003961 | 1/2013 | |
| JP | 2014526099 A | 10/2014 | |
| KR | 101052805 B1 | 7/2011 | |
| WO | WO-2012121433 A1 | 9/2012 | |

OTHER PUBLICATIONS

Milgram, Paul et al., "Telerobotic Control Using Augmented Reality" Proceedings 4th IEEE International Workshop on Robot and Human Communication, Tokyo, Japan, Jul. 1995, pp. 21-29.
International Search Report and Written Opinion issued in PCT/CN2016/076541, dated Apr. 6, 2017; ISA/CN.
European Search Report regarding Application No. 16850048.6 dated Dec. 4, 2019.

* cited by examiner

METHOD AND DEVICE FOR DETERMINING POSITION OF VIRTUAL OBJECT IN VIRTUAL SPACE

CROSS-REFERENCE TO RELATED APPLICATION

This application is a U.S. National Phase Application under 35 U.S.C. 371 of International Application No. PCT/CN2016/076541 filed on Mar. 16, 2016 and published in Chinese as WO 2017/054420 A1 on Apr. 6, 2017. This application claims the benefit of Chinese Application No. 201510638981.7 filed on Sep. 30, 2015, titled "METHOD AND DEVICE FOR DETERMINING POSITION OF VIRTUAL OBJECT IN VIRTUAL SPACE". The disclosures of both of the above applications are incorporated herein by reference in their entirety.

FIELD OF THE INVENTION

The present invention relates to the field of virtual reality, and in particular, to a method and a device for determining the position of a virtual object in a virtual space.

BACKGROUND OF THE INVENTION

Virtual reality (VR, for short) technology is a technology in which a virtual space is constructed via an electronic device and sensory simulation on vision and audition, etc., is provided for a user on the basis of the virtual space. By virtual reality technology, a user may interact with a virtual object in the virtual space, and an on-scene vision experience, audition experience and touch experience, etc., may be provided for the user.

In order to strengthen the realism of the virtual space and provide an on-scene vision experience for a user, a virtual reality device needs to construct a virtual scene in the virtual space according to a scene in the reality space. When a virtual scene in the virtual space is constructed according to a scene in the reality space, the virtual reality device needs to construct a corresponding virtual object in the virtual space according to an object in the reality space. For example, when a desk exists in the reality space, a virtual desk needs to be constructed correspondingly in the virtual space according to the desk in the reality space. Therefore, there needs a method that can determine the position of a virtual object in a virtual space according to the position of a reality object in a reality space.

SUMMARY OF THE INVENTION

Embodiments of the present invention provide a method and a device for determining the position of a virtual object in a virtual space, thereby meet the technical demand on adjusting the posture angle of a virtual object in the virtual space according to the change in posture angle of a peripheral device.

In a first aspect, an embodiment of the invention provides a method for determining the position of a virtual object in a virtual space, which comprises: detecting whether a predetermined triggering condition for determining the position of a virtual object in a virtual space according to a movement trajectory of a peripheral device is met; when the predetermined triggering condition is met, acquiring at least three sampling points by sampling the movement trajectory of the peripheral device in a reality space; when the movement trajectory forms a loop, determining a reality space plane on which the sampling points exist; converting the reality space plane into a target plane in the virtual space according to a preset transformation relation; and determining the position of the virtual object in the virtual space by setting a designated side of the virtual object on the target plane.

In conjunction with the first aspect, in a first possible implementation mode of the first aspect, detecting whether a predetermined triggering condition for determining the position of a virtual object in a virtual space according to a movement trajectory of a peripheral device is met comprises: detecting whether a positioning component of the peripheral device contacts a reality object in the reality space.

In conjunction with the first possible implementation mode of the first aspect, in a second possible implementation mode of the first aspect, acquiring at least three sampling points by sampling the movement trajectory of the peripheral device in a reality space when the predetermined triggering condition is met comprises: when the positioning component contacts the reality component, acquiring at least three sampling points by sampling a movement trajectory of the positioning component in the reality space.

In conjunction with the first aspect, in a third possible implementation mode of the first aspect, determining a reality space plane on which the sampling points exist when the movement trajectory forms a loop comprises: determining coordinate values of the sampling points in a reality space reference coordinate system; and when the movement trajectory forms a loop, fitting out the reality plane according to the coordinate values of the sampling points.

In conjunction with the first aspect, in a fourth possible implementation mode of the first aspect, determining the position of the virtual object in the virtual space by setting a designated side of the virtual object on the target plane comprises: determining the position of the virtual object in the virtual space by setting a designated side of the virtual object on the target plane, wherein, the virtual object correspond to the reality object, and a reference point in the designated side coincides with a fiducial point in the target plane.

In a second aspect, an embodiment of the invention provides a device for determining the position of a virtual object in a virtual space, which comprises: a detection unit, configured for detecting whether a predetermined triggering condition for determining the position of a virtual object in a virtual space according to a movement trajectory of a peripheral device is met; a sampling unit, configured for acquiring at least three sampling points by sampling the movement trajectory of the peripheral device in a reality space when the predetermined triggering condition is met; a determination unit, configured for determining a reality space plane on which the sampling points exist when the movement trajectory forms a loop; a conversion unit, configured for converting the reality space plane into a target plane in the virtual space according to a preset transformation relation; and a positioning unit, configured for determining the position of the virtual object in the virtual space by setting a designated side of the virtual object on the target plane.

In conjunction with the second aspect, in a first possible implementation mode of the second aspect, the detection unit is specifically configured for detecting whether a positioning component of the peripheral device contacts a reality object in the reality space.

In conjunction with the first possible implementation mode of the second aspect, in a second possible implementation mode of the second aspect, the sampling unit is specifically configured for acquiring at least three sampling points by sampling a movement trajectory of the positioning component in the reality space when the positioning component contacts the reality component.

In conjunction with the second aspect, in a third possible implementation mode of the second aspect, the determination unit comprises: a coordinate value determination subunit, configured for determining coordinate values of the sampling points in a reality space reference coordinate system; and a plane fitting subunit, configured for fitting out the reality plane according to the coordinate values of the sampling points when the movement trajectory forms a loop.

In conjunction with the second aspect, in a fourth possible implementation mode of the second aspect, the positioning unit is specifically configured for determining the position of the virtual object in the virtual space by setting a designated side of the virtual object on the target plane, wherein, the virtual object correspond to the reality object, and a reference point in the designated plane coincides with a fiducial point in the target plane.

In the embodiments of the invention, it detects whether a predetermined triggering condition for determining the position of a virtual object in a virtual space according to a movement trajectory of a peripheral device is met; when the predetermined triggering condition is met, at least three sampling points are acquired by sampling the movement trajectory of the peripheral device in a reality space; when the movement trajectory forms a loop, a reality space plane on which the sampling points exist is determined; the reality space plane is converted into a target plane in the virtual space according to a preset transformation relation; and the position of the virtual object in the virtual space is determined by setting a designated side of the virtual object on the target plane. By the method and the device according to the present invention, the position of a reality object in a reality space may be determined according to the movement trajectory of a peripheral device in the reality space, and then the position of a virtual object in a virtual space may be determined according to the position of the reality object in the reality space, thereby determining the position of the virtual object in the virtual space according to the position of the reality object in the reality space.

BRIEF DESCRIPTION OF THE DRAWINGS

In order to more clearly illustrate the technical solutions of the embodiments of the invention or of the prior art, the drawings needed in the description of the embodiments or the prior art will be briefly introduced below. Apparently, the drawings in the description below are only some embodiments of the invention, and other drawings may also be obtained by one of ordinary skills in the art according to these drawings without creative work.

DETAILED DESCRIPTION OF THE EMBODIMENTS

The technical solutions in the embodiments of the invention will be described clearly and fully below in conjunction with the drawings in the embodiments of the invention. Apparently, the embodiments described are only a part of the embodiments of the invention, rather than being the whole embodiments. All the other embodiments obtained by one of ordinary skills in the art based on the embodiments of the invention without creative work pertain to the protection scope of the invention.

Figure 1:
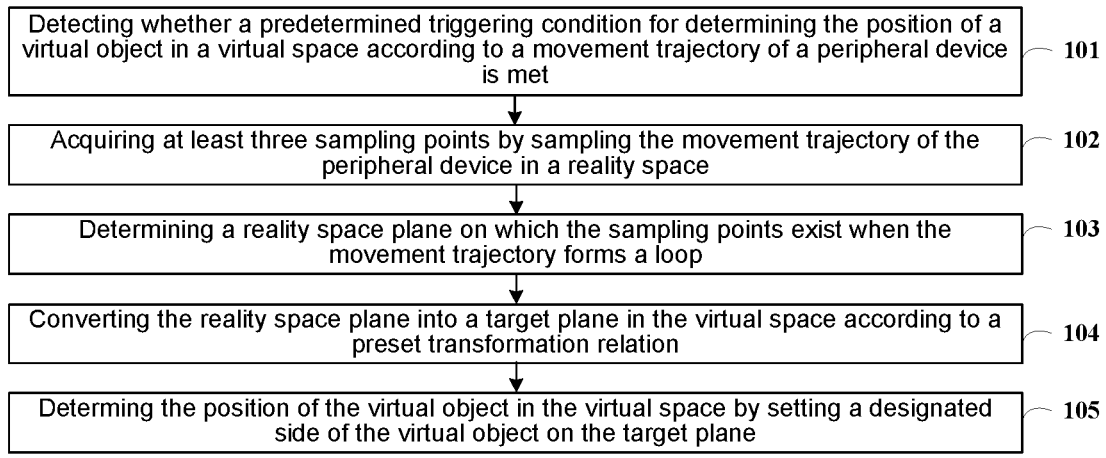
FIG. 1 is a schematic flow chart of an embodiment of a method for determining the position of a virtual object in a virtual space according to the invention.

Referring to FIG. 1, it is a flow chart of an embodiment of a method for determining the position of a virtual object in a virtual space according to the invention. The method may be performed by a virtual reality (VR) device, the VR device may be VR glasses or VR helmets, etc., and the peripheral device may be a device with a capability of acquiring and reporting a posture angle in a reality space. The method includes the steps below:

Step 101: it detects whether a predetermined triggering condition for determining the position of a virtual object in a virtual space according to a movement trajectory of a peripheral device is met.

The VR device may periodically detects whether the predetermined triggering condition is met. Wherein, the predetermined triggering condition may be set in advance by a technician as required. For example, it may be whether a designated button on the peripheral device is pressed, or whether a positioning component of the peripheral device contacts a reality object in the reality space. Wherein, detecting whether the positioning component of the peripheral device contacts a reality object in the reality space is determined via a signal reported by a pressure sensor on the positioning component.

Step 102: when the predetermined triggering condition is met, at least three sampling points are acquired by sampling the movement trajectory of the peripheral device in a reality space.

When the predetermined triggering condition is met, it indicates that the VR device needs to determine the position of a virtual object in the virtual space. At this time, the VR device may sample a movement trajectory of the peripheral device in the reality space at a preset frequency. Because at least three points on a certain plane are needed to determine the position of the plane, the VR device may acquire at least three sampling points when sampling the movement trajectory.

For example, when the positioning component contacts the reality component, the VR device may acquire at least three sampling points by sampling a movement trajectory of the positioning component in the reality space at a predetermined sampling frequency. Or, the VR device may acquire at least three sampling points by sampling a movement trajectory of the positioning component in the reality space at a predetermined sampling frequency when a designated button is pressed.

Step 103: when the movement trajectory forms a loop, a reality space plane on which the sampling points exist is determined.

Because calculation errors exist, when the reality plane is determined according to the sampling points, the nearer the distribution of the sampling points is to the same straight line, the more inaccurate the reality plane determined according to the sampling points will be. In order to make the determination of the reality plane more accurate, the VR device may determine the reality space plane on which the sampling points exist when the movement trajectory forms a loop, wherein, the movement trajectory forming a loop may refer to that the movement trajectory formed passes through the same coordinate point in the reality space twice. For example, when the device detects that an intersection point exists between the connecting line of two adjacent sampling points and the connecting line of another two adjacent sampling points, it may be regarded that the movement trajectory forms a loop.

When the movement trajectory forms a loop, the VR device may fit out the reality plane on which the sampling points exist according to the coordinates of the sampling points. Wherein, the coordinates of the sampling points may be the coordinates of the sampling points in any predetermined coordinate system in the reality space, and the reality plane may also be expressed by an expression in the predetermined coordinate system. For example, the display plane may be expressed by $Ax+By+Cz+D=0$, wherein, the value of at least one of A, B, C and D is not 0.

Step 104: the reality space plane is converted into a target plane in the virtual space according to a preset transformation relation.

After the reality position of the reality plane is determined, the reality space plane may be converted into a target plane in the virtual space according to a preset transformation relation. Wherein, the preset transformation relation may be a fixed transformation relation, or it may be a transformation relation selected from standby transformation relations according to the predetermined triggering condition.

For example, when the reality position is expressed by $Ax+By+Cz+D=0$, the target position may be expressed by $ax+by+cz+d=0$, wherein, a, b, c and d are calculated according to A, B, C and D by the VR device via the preset transformation relation. Similarly, at least one of a, b, c and d is not 0.

Step 105: the position of the virtual object in the virtual space is determined by setting a designated side of the virtual object on the target plane.

Because a virtual object generally has a plurality of sides, after the target position is determined, the VR device may set a designated side of the plurality of sides on the target plane, so that the position of the virtual object in the virtual space may be determined. Wherein, the designated side may be any side on the surface of the virtual object, or it may be any side inside the virtual object.

Because the target plane and the designated side generally are both unrestrictedly-extending planes, when the designated side of the virtual object is set on the target plane, one point in the target plane may first be selected as a fiducial point, and then one point on the designated side of the virtual object may be selected as a reference point, and hence the designated side of the virtual object is set on the target plane and the reference point is made to coincide with the fiducial point. Wherein, the fiducial point may be any point in the target plane, and generally it may be automatically selected by the VR device; then, the reference point may be any point in the designated side, because the designated side generally is a polygon, under normal conditions, the reference point may be the center of gravity of the designated side.

By this embodiment, the VR device may determine the position of a reality object in a reality space according to the movement trajectory of a peripheral device in the reality space, and then it may determine the position of a virtual object in a virtual space according to the position of the reality object in the reality space, thereby determining the position of the virtual object in the virtual space according to the position of the reality object in the reality space.

Corresponding to the method for determining the position of a virtual object in a virtual space according to the invention, the invention further provides a device for determining the position of a virtual object in a virtual space.

Figure 2:
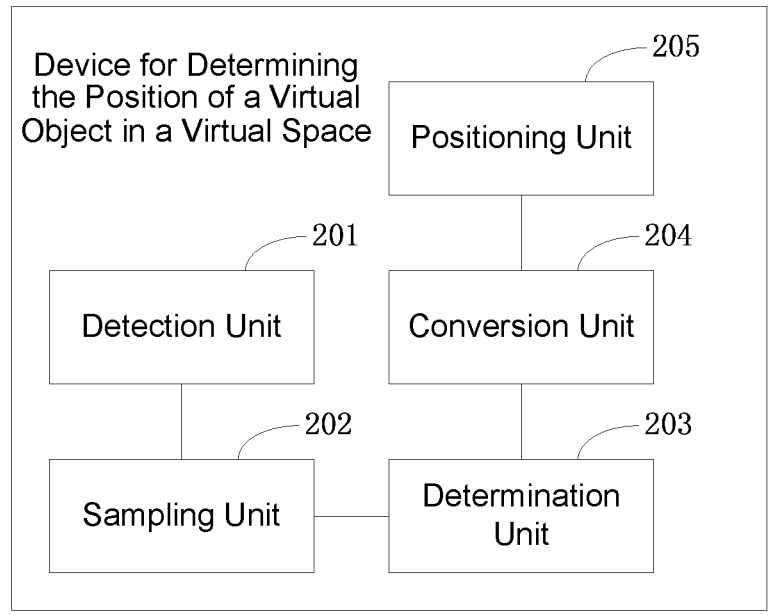
FIG. 2 is a structural representation of an embodiment of a device for determining the position of a virtual object in a virtual space according to the invention.

Referring to FIG. 2, it is a structural representation of an embodiment of a device for determining the position of a virtual object in a virtual space according to the invention. The device may be provided on a VR device.

As shown in FIG. 2, the device may include: a detection unit 201, a sampling unit 202, a determination unit 203, a conversion unit 204 and a positioning unit 205.

Wherein, the detection unit 201 is configured for detecting whether a predetermined triggering condition for determining the position of a virtual object in a virtual space according to a movement trajectory of a peripheral device is met; the sampling unit 202 is configured for acquiring at least three sampling points by sampling the movement trajectory of the peripheral device in a reality space when the predetermined triggering condition is met; the determination unit 203 is configured for determining a reality space plane on which the sampling points exist when the movement trajectory forms a loop; the conversion unit 204 is configured for converting the reality space plane into a target plane in the virtual space according to a preset transformation relation; and the positioning unit 205 is configured for determining the position of the virtual object in the virtual space by setting a designated side of the virtual object on the target plane.

Optionally, the detection unit 201 is specifically configured for detecting whether a positioning component of the peripheral device contacts a reality object in the reality space.

Optionally, the sampling unit 202 is specifically configured for acquiring at least three sampling points by sampling a movement trajectory of the positioning component in the reality space when the positioning component contacts the reality component.

Optionally, the determination unit 203 includes: a coordinate value determination subunit, configured for determining coordinate values of the sampling points in a reality space reference coordinate system; and a plane fitting subunit, configured for fitting out the reality plane according to the coordinate values of the sampling points when the movement trajectory forms a loop.

Optionally, the positioning unit 205 is specifically configured for determining the position of the virtual object in the virtual space by setting a designated side of the virtual object on the target plane, wherein, the virtual object correspond to the reality object, and a reference point in the designated side coincides with a fiducial point in the target plane.

By this embodiment, the position of a reality object in a reality space may be determined according to the movement trajectory of a peripheral device in the reality space, and then the position of a virtual object in a virtual space may be determined according to the position of the reality object in the reality space, so that the position of the virtual object in the virtual space may be determined according to the position of a reality object in a reality space.

One skilled in the art may clearly understand that the invention may be implemented by aid of software and necessary universal hardware platform. Based on such an understanding, the essential part of the technical solutions in the embodiments of the invention, or in other words, the part that contributes to the prior art, may be embodied in the form of a software product that is stored in a storage medium, for example, ROM/RAM, magnetic disc or compact disc, etc., and includes several instructions that can make a computer device (which may be a personal computer, a server or a network device, etc.) implement the method according to each embodiment of the invention or a certain part thereof.

Each embodiment in this specification is described in a stepped mode. For the same or similar part between each embodiment, reference may be made to each other, and each embodiment focuses on the difference from other embodiments. Especially, for a device or system embodiment, because it is basically similar to a method embodiment, the description thereof will be simple, and reference may be made to the part of the illustration of the method embodiment for the related part.

The above description only shows some specific implementation modes of the invention. It should be pointed out that, for one of ordinary skills in the art, several improvements and modifications may also be made without departing from the principles of the invention, and all these improvements and modifications should be regarded as falling into the protection scope of the invention.

What is claimed is:

1. A method for determining a position of a virtual object in a virtual space, comprising:
    detecting whether a predetermined triggering condition for determining the position of the virtual object in the virtual space according to a movement trajectory of a peripheral device is met;
    acquiring at least three sampling points by sampling the movement trajectory of the peripheral device in a reality space when the predetermined triggering condition is met;
    determining a reality space plane on which the sampling points exist when the movement trajectory forms a loop, wherein determining the reality space plane on which the sampling points exist when the movement trajectory forms the loop comprises determining coordinate values of the sampling points in a reality space reference coordinate system and fitting out the reality space plane according to the coordinate values of the sampling points when the movement trajectory forms the loop;
    converting the reality space plane into a target plane in the virtual space according to a preset transformation relation; and
    determining the position of the virtual object in the virtual space by setting a designated side of the virtual object on the target plane.

2. The method according to claim 1, wherein, detecting whether the predetermined triggering condition for determining the position of the virtual object in the virtual space according to the movement trajectory of the peripheral device is met comprises:
    detecting whether a positioning component of the peripheral device contacts a reality object in the reality space.

3. The method according to claim 2, wherein, acquiring the at least three sampling points by sampling the movement trajectory of the peripheral device in the reality space when the predetermined triggering condition is met comprises:
    when the positioning component contacts the reality object, acquiring the at least three sampling points by sampling the movement trajectory of the positioning component in the reality space.

4. The method according to claim 1, wherein, determining the position of the virtual object in the virtual space by setting the designated side of the virtual object on the target plane comprises:
    determining the position of the virtual object in the virtual space by setting the designated side of the virtual object on the target plane, wherein, the virtual object correspond to a reality object in the reality space, and a reference point in the designated side coincides with a fiducial point in the target plane.

* * * * *